United States Patent
Kim (10) Patent No.: US 10,268,292 B2
(45) Date of Patent: Apr. 23, 2019

(54) TOUCH TYPE LIQUID CRYSTAL DISPLAY DEVICE

(71) Applicant: LG Display Co., Ltd, Seoul (KR)

(72) Inventor: Jae-Wook Kim, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/982,633

(22) Filed: Dec. 29, 2015

(65) Prior Publication Data

US 2016/0188063 A1  Jun. 30, 2016

(30) Foreign Application Priority Data

Dec. 30, 2014  (KR) .......................... 10-2014-0194199

(51) Int. Cl.
| | |
|---|---|
| *G06F 3/041* | (2006.01) |
| *G09G 3/36* | (2006.01) |
| *G06F 3/044* | (2006.01) |
| *G02F 1/1333* | (2006.01) |

(52) U.S. Cl.
CPC ........ *G06F 3/0412* (2013.01); *G02F 1/13338* (2013.01); *G06F 3/044* (2013.01); *G09G 3/3648* (2013.01); *G06F 2203/04107* (2013.01); *G09G 2300/0426* (2013.01); *G09G 2320/0233* (2013.01)

(58) Field of Classification Search
CPC ............................................ G06F 2203/04107
See application file for complete search history.

(56) References Cited

U.S. PATENT DOCUMENTS

| | | | | |
|---|---|---|---|---|
| 2002/0191138 | A1* | 12/2002 | Matsumoto | G02F 1/134363 349/141 |
| 2004/0066481 | A1* | 4/2004 | Hong | G02F 1/134363 349/141 |
| 2011/0157039 | A1* | 6/2011 | Shin | G02F 1/13338 345/173 |
| 2014/0118642 | A1* | 5/2014 | Wang | G02F 1/13338 349/12 |
| 2014/0184543 | A1 | 7/2014 | Kim et al. | |

FOREIGN PATENT DOCUMENTS

| | | |
|---|---|---|
| TW | 201426457 A | 7/2014 |
| TW | M491878 U | 12/2014 |

* cited by examiner

*Primary Examiner* — Michael A Faragalla
*Assistant Examiner* — Chayce R Bibbee
(74) *Attorney, Agent, or Firm* — Birch, Stewart, Kolasch & Birch, LLP (57) ABSTRACT

A touch type liquid crystal display device includes a first pixel region and a second pixel region that neighbor each other with a data line therebetween, and each pixel region includes a thin film transistor and a pixel electrode connected to the thin film transistor. The touch type liquid crystal display device further includes a first touch block and a second touch block including the first pixel region and the second pixel region, respectively, a common electrode that is arranged in a same substrate as the pixel electrode, and is located in each of the first and second touch blocks, and a sensing line that is connected to the common electrode of each of the first and second touch blocks, wherein the common electrode of the first touch block goes over the data line and extends into the second pixel region.

10 Claims, 5 Drawing Sheets

TOUCH TYPE LIQUID CRYSTAL DISPLAY DEVICE

CROSS-REFERENCE TO RELATED APPLICATIONS

The present application claims the priority benefit of Korean Patent Application No. 10-2014-0194199 filed in Republic of Korea on Dec. 30, 2014, which is hereby incorporated by reference in its entirety for all purposes as if fully set forth herein.

BACKGROUND OF THE INVENTION

Field of the Invention

The present disclosure relates to a touch type liquid crystal display device (LCD), and particularly, relates to a touch screen LCD which does not require a blocking line to block light leakage over a data line at a boundary of a touch block.

Discussion of the Related Art

Facing information society, display field of displaying electric information signals has been rapidly advanced, and accordingly, various flat display devices have been developed and used. As flat display devices, a liquid crystal display device (LCD), a plasma display panel device (PDP), an organic light emitting diode (OLED) display device and the like are used.

Among the flat display devices, LCDs are widely used because they have advantages of small size, light weight, thin profile, low power consumption, and the like.

Recently, a touch function has been added to the LCD. Particularly, to achieve thin profile, used is an in-cell touch type LCD, in which a touch screen is embedded.

Figure 1:
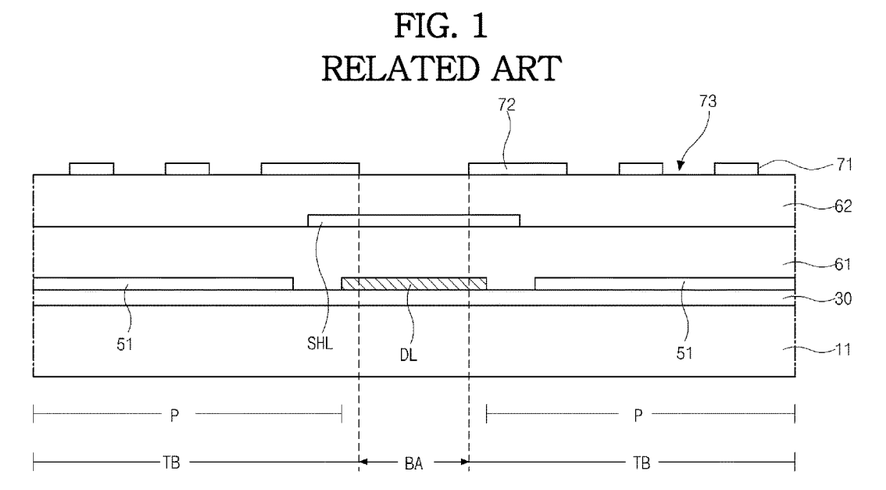
FIG. 1 is a cross-sectional view illustrating an in-cell touch type LCD according to the related art.

FIG. 1 is a cross-sectional view illustrating an in-cell touch type LCD according to the related art.

Referring to FIG. 1, in the related art LCD, a pixel electrode 51 and a common electrode 71 are formed together in an array substrate to induce a fringe field as an electric field. This type LCD may be referred to as an FFS (fringe field switching) type or AH-IPS (advanced high performance in-plane switching) type LCD.

In the LCD, a plurality of touch blocks TB are arranged, and each touch block TB includes a group of neighboring pixel regions P arranged in row and column directions.

In the array substrate, a gate insulating layer 30 is formed on a substrate 11, and a pixel electrode 51 is formed on the gate insulating layer 30 in each pixel region P. Passivation layers 61 and 62 are formed on the pixel electrode 51, and a common electrode 71 is formed on the passivation layers 61 and 62 in each touch block TB.

The common electrode 71 includes a plurality of common patterns 72 corresponding to each pixel region P and an opening 73 between adjacent common patterns 72.

In a display period to display images, the common electrode 71 is supplied with a common voltage and functions as an opposing electrode to generate an electric field together with the pixel electrode 51. In a touch sensing period, the common electrode 71 functions as a touch electrode.

The common electrode 71 is patterned per touch block TB and is connected to a sensing line corresponding to each touch block TB, and is separated and spaced apart from a common electrode 71 of a neighboring touch block TB.

A boundary region BA between neighboring touch blocks TB is located over a data line DL. The touch electrodes 71 of the neighboring touch blocks TB are separated over the data line DL.

In this case, because of a voltage difference between the data line DL and the common electrode 71, liquid crystal around them is operated abnormally, and thus light leakage is caused at the boundary of the touch block TB.

To prevent this problem, a blocking line SHL over the data line DL at the boundary of the touch block TB is additionally required to block the light leakage, and the blocking line SHL is supplied with the same signal as the sensing line connected to the touch block TB. The blocking line SHL extends to a non-display region of the LCD and then is connected to a driving circuit as the sensing line is.

As described above, in the related art LCD, since the blocking line SHL is required in addition to the sensing line, design and manufacturing process of the LCD are complicated, and, when there is a limit on a size of an LCD, such as high-resolution model or narrow-bezel model, it is difficult to achieve such a model.

Further, as the blocking line SHL is additionally disposed over the data line DL, a load of the data line DL due to the blocking line SHL increases, and thus possibility of defect generation at the boundary of the touch block TB can increase.

SUMMARY OF THE INVENTION

Accordingly, the present invention is directed to a touch type LCD that does not require a blocking line to block light leakage over a data line at a boundary of a touch block.

Additional features and advantages of the disclosure will be set forth in the description which follows, and in part will be apparent from the description, or may be learned by practice of the disclosure. The advantages of the disclosure will be realized and attained by the structure particularly pointed out in the written description and claims as well as the appended drawings.

To achieve these and other advantages, and in accordance with the purpose of the present invention, as embodied and broadly described herein, a touch type liquid crystal display device includes a first pixel region and a second pixel region that neighbor each other with a data line disposed therebetween, and each pixel region includes a thin film transistor and a pixel electrode connected to the thin film transistor, a first touch block and a second touch block including the first pixel region and the second pixel region, respectively, a common electrode that is arranged in a same substrate as the pixel electrode, and is located in each of the first and second touch blocks, and a sensing line that is connected to the common electrode of each of the first and second touch blocks, wherein the common electrode of the first touch block goes over the data line and extends into the second pixel region.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments, examples of which are illustrated in the accompanying drawings. The same or like reference numbers may be used throughout the drawings to refer to the same or like parts.

Figure 2:
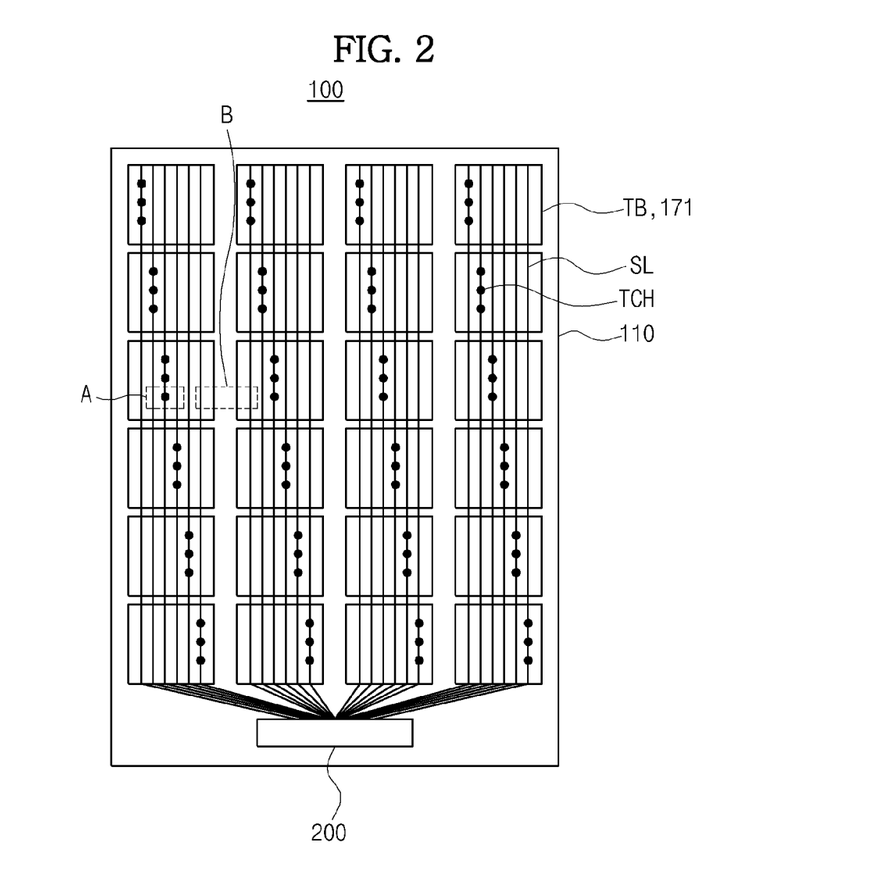
FIG. 2 is a schematic view illustrating a touch type LCD according to an embodiment of the present invention.

FIG. 2 is a schematic view illustrating a touch type LCD according to an embodiment of the present invention.

Referring to FIG. 2, the touch type LCD 100 of the embodiment includes a display panel 110 to display images, and a panel driving circuit 200 to operate the liquid crystal panel 110.

The liquid crystal panel 110 is an in-cell touch type liquid crystal panel in which a common electrode 171 functioning as a touch electrode is embedded. The liquid crystal panel 110 includes an array substrate, an opposing substrate facing the array substrate, for example, a color filter substrate, and a liquid crystal panel between the array substrate and the color filter substrate.

It is preferred, but not limited that the liquid crystal panel 110 has a structure that a pixel electrode and the common electrode 171 are formed together in the array substrate. For example, the liquid crystal panel 110 is an IPS type or AH-IPS type liquid crystal panel. For the purpose of explanations, an AH-IPS type liquid crystal panel 110 is described in this embodiment.

The liquid crystal panel 110 includes a display region and a non-display region surrounding the display region. A plurality of pixel regions are arranged in a matrix form in the row and column directions in the display region.

Further, the liquid crystal panel 110 includes a plurality of touch blocks TB arranged in a matrix form in the row and column directions in the display region. Each touch block TB includes a group of a plurality of neighboring pixel regions on row and column lines.

A common electrode 171 is formed in each touch block TB in the array substrate. The common electrode 171 of each touch block TB is patterned to be separated and spaced apart from a common electrode 171 of neighboring touch block TB. In other words, the common electrodes 171 of the neighboring touch blocks TB are configured to be electrically disconnected from each other.

A sensing line SL connected to the corresponding touch block TB in the array substrate extends along a direction. For example, the sensing line SL extends along a column direction which is an extension direction of the data line DL. The sensing line SL may contact the common electrode 171 of the corresponding touch block TB to transfer a driving signal to the common electrode 171.

In this regard, in each frame as a display period to display images, the sensing line SL is supplied with a common voltage and transferred to the corresponding common electrode 171. Accordingly, an electric field is induced between the pixel electrode and the common electrode 171 in each pixel region to operate liquid crystal, and thus images can be displayed.

In each blank period between neighboring frames as a touch sensing period between display periods, the sensing line SL is supplied with a touch driving signal and transferred to the common electrode 171. Further, a sensing signal that corresponds to change of capacitance of the touch block TB according to touching is detected by the touch electrode 171 and is supplied to the sensing line SL. By the detected sensing signal, user's touching can be determined.

Since the common electrode 171 in the touch block TB functions as an electrode to generate an electric field and a touch electrode to detect user's touching as well, an in-cell touch type liquid crystal panel 110 can be achieved, and a thickness of the liquid crystal panel 110 can be reduced.

The panel driving circuit 200 generates various signals to operate the liquid crystal panel 110 and supplies the signals to the liquid crystal panel 110. For example, the panel driving circuit 200 outputs gate signals to respective gate lines, outputs data signals to respective data lines, and common voltages and touch driving signals to respective sensing lines SL. Further, the panel driving circuit 200 are supplied with sensing signals generated by respective common electrodes 171 through respective sensing lines SL.

The panel driving circuit 200 may include a data driving circuit to operate the data lines, a gate driving circuit to operate the gate lines, and a touch sensing circuit to operate the sensing lines SL. For example, each of the data driving circuit, the gate driving circuit, and the touch sensing circuit may be configured in an IC. Alternatively, at least two of these circuits may be configured in an IC. Further, the gate driving circuit may be configured in a GIP circuit, which is formed directly in the array substrate.

The panel driving circuit 200 configured in IC type may be mounted at the non-display region of the liquid crystal panel 110 in a COG manner. Alternatively, the panel driving circuit configured in IC type may be mounted on a flexible film and is connected to the liquid crystal panel 110 through the flexible film.

Even though not shown in the drawings, the LCD 100 includes a backlight unit as a light source to supply light to the liquid crystal panel 110. The backlight unit may use CCFL (cold cathode fluorescent lamp), EEFL (external electrode fluorescent lamp), LED (light emitting diode), or the like.

A structure of the liquid crystal panel 110 is explained in more detail with reference to FIGS. 3 and 4.

Figure 3:
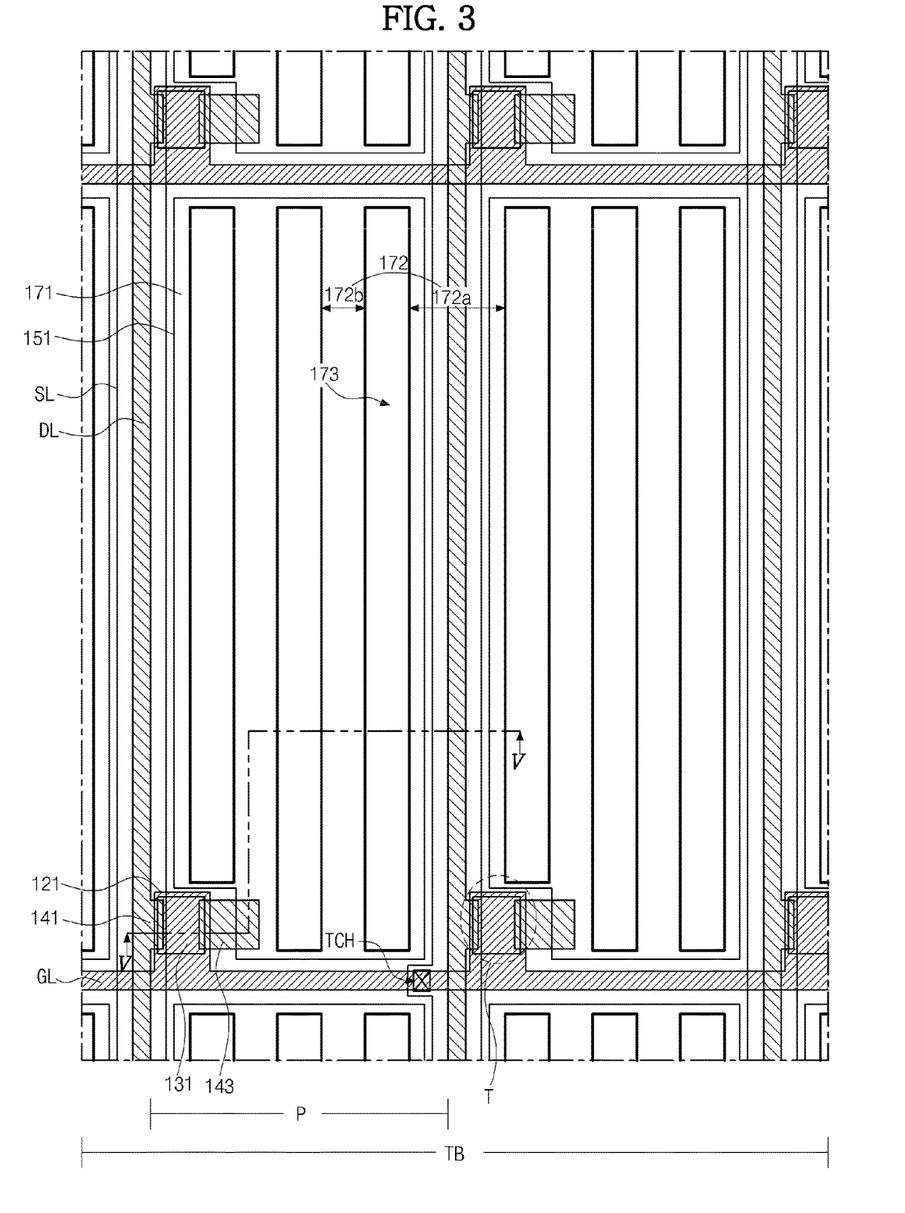
FIG. 3 is a plan view illustrating a part of a touch block of a liquid crystal panel according to an embodiment of the present invention.
Figure 4:
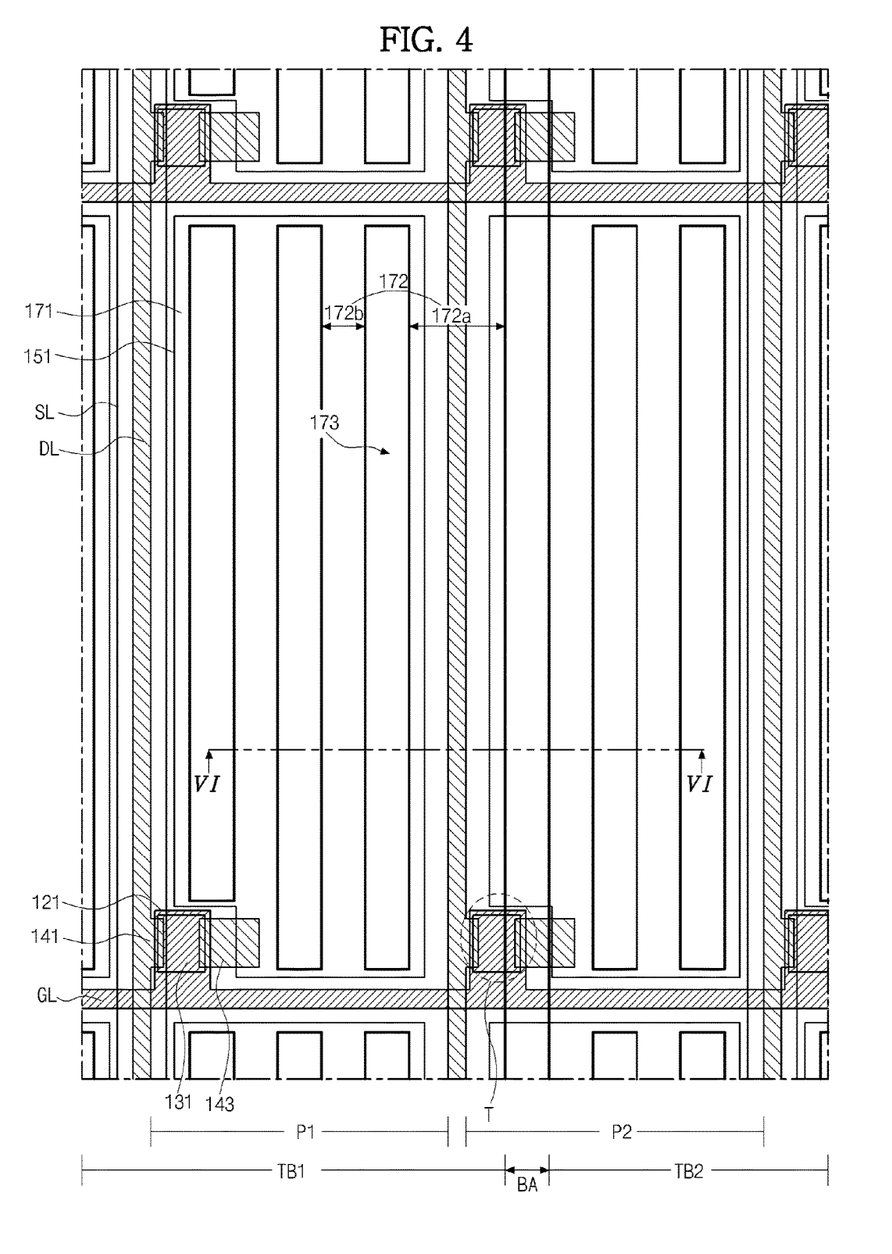
FIG. 4 is a plan view illustrating a boundary portion of a touch block according to an embodiment of the present invention.

FIG. 3 is a plan view illustrating a part of a touch block of a liquid crystal panel according to an embodiment of the present invention, and FIG. 4 is a plan view illustrating a boundary portion of a touch block according to an embodiment of the present invention. FIG. 3 shows a region "A" in FIG. 2, and FIG. 4 shows a region of "B" in FIG. 2.

Referring to FIGS. 3 and 4, in the array substrate of the liquid crystal panel 110, a plurality of gate lines GL extend along a first direction i.e., a row direction, and a plurality of data lines DL extend along a second direction i.e., a column direction.

A plurality of pixel regions P in a matrix form are defined by the crossing gate and data lines GL and DL.

In each pixel region P, a thin film transistor T connected to the gate and data lines GL and DL is located.

The thin film transistor T includes a gate electrode 121 connected to the gate line GL, a semiconductor layer 131 on the gate electrode 121, and source and drain electrodes 141 and 143 spaced apart from each other over the semiconductor layer 131. The source electrode 141 is connected to the data line DL.

In each pixel region P, a pixel electrode 151 connected to the drain electrode 143 of the thin film transistor T is formed.

The common electrode 171 is formed per touch block TB, and may be located on the pixel electrode 151 with an insulating layer therebetween to generate an electric field. The common electrode 171 may include a plurality of electrode patterns 172 in bar shape facing the pixel electrode 151 in each pixel region P, and an opening 173 between neighboring electrode patterns 172.

The electrode patterns 172 may be configured to extend along an extension direction of the data line DL. The electrode patterns 172 may include a first pattern 172a near the data line DL which is an outermost pattern in the pixel region P, and a second pattern 172b located at an inner side in the pixel region P than the first pattern 172a.

In this case, the first electrode pattern 172a may have a width greater than a width of the data line DL to substantially shield the data line DL. Further, the first electrode pattern 172a may have a width greater than a width of the sensing line SL overlapping the data line DL to substantially shield the sensing line SL.

When the first electrode pattern 172a is formed with this configuration, interference between the pixel electrode 151 and each of the data line DL and the sensing line SL can be prevented.

The second electrode pattern 172b at the relative inner side may have a width less than a width of the first electrode pattern 172a.

In an alternative example regarding the arrangement of the common electrode 171 and the pixel electrode 151, a common electrode 171 having substantially a plate shape may be formed in each touch block TB, and a pixel electrode 151 having a plurality of electrode patterns may be formed on the common electrode 171 in each pixel region P with an insulating layer therebetween.

In another alternative example, a common electrode 171 and a pixel electrode 151 may each have a plurality of electrode patterns, and be formed on the same layer or different layers with an insulating layer therebetween.

Referring to FIG. 3, in the array substrate, the sensing line SL connected to the corresponding to the touch block TB and transferring a driving signal is formed. The sensing line SL may extend along the extension direction of the data line DL in the corresponding touch block TB, and overlap the data line DL. When the sensing line SL is arranged to overlap the data line DL as a non-display element, reduction of aperture ratio due to the sensing line SL can be prevented, and resistance of the sensing line SL can be reduced by increasing a width of the sensing line SL as much as possible.

The sensing line SL and the common electrode 171 may be arranged with an insulating layer therebetween, and may contact each other through a contact hole TCH formed in the insulating layer.

Referring to FIG. 4, a boundary region i.e., a separate region BA between touch blocks TB neighboring each other along a width direction of the data line DL is configured to be located in an outermost pixel region out of pixel regions constituting one of the neighboring touch blocks TB.

For the purpose of explanations, out of the two neighboring touch blocks TB1 and TB2, a touch block located at left is referred to as a first touch block TB1 while a touch block located at right is referred to as a second touch block TB2. Further, an outermost i.e., rightmost pixel region of the first touch block TB1 is referred to as a first pixel region P1 while an outermost i.e., leftmost pixel region of the second touch block TB2 is referred to as a second pixel region P2. The first and second pixel regions P1 and P2 are located at opposite sides with the data line DL therebetween, and each are outermost pixel regions of the first and second touch blocks TB1 and TB, respectively.

In this case, an outermost part i.e., the first electrode pattern 172a of the common electrode 171 located at the first pixel region P1 of the first touch block TB1 is configured to extend into the second pixel region P2 of the second touch block TB2.

In other words, the first electrode pattern 172a of the common electrode 171 of the first pixel region P1 extends into the second pixel region P2 covering the data line DL, and is separated from the common electrode 171 i.e., the second electrode pattern 172b of the second pixel region P2.

Accordingly, the separate region BA between the neighboring first and second touch blocks TB1 and TB2 is not located over the data line DL but is located at the second pixel region P2 as an outermost pixel region of the second touch block TB2.

Thus, a blocking line of the related art is not additionally required over the data line DL near the first and second touch blocks TB1 and TB2.

In other words, referring to FIG. 1, in the related art, since the boundary between the neighboring touch blocks TB is located over the data line DL, the additional blocking line SHL is required to prevent light leakage through the boundary between the touch blocks TB.

To the contrary, in the embodiment, the boundary between the first and second touch blocks TB1 and TB2 is not located over the data line DL but is located over the second pixel region P2 at one side of the data line DL, and the data line DL is blocked by the first touch block TB1.

Accordingly, light leakage does not happen over the data line DL, and thus the blocking line of the related art to prevent light leakage is not needed.

Therefore, design and manufacturing process of the LCD can be simplified, and, even when there is a limit on a size of the LCD, such as high-resolution model or narrow-bezel model, it can be easy to achieve such a model.

Further, since the increase of a load of the data line due to a blocking line can be prevented, possibility of defect generation at a boundary of a touch block can be removed.

A cross-sectional structure of the liquid crystal panel 110 is explained in more detail with reference to FIGS. 5 and 6.

Figure 5:
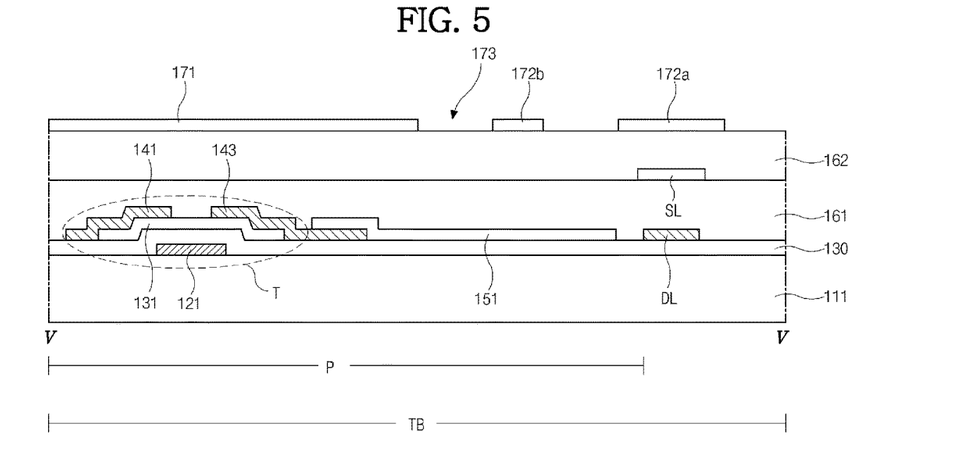
FIG. 5 is a cross-sectional view taken along a line V-V of FIG. 3.
Figure 6:
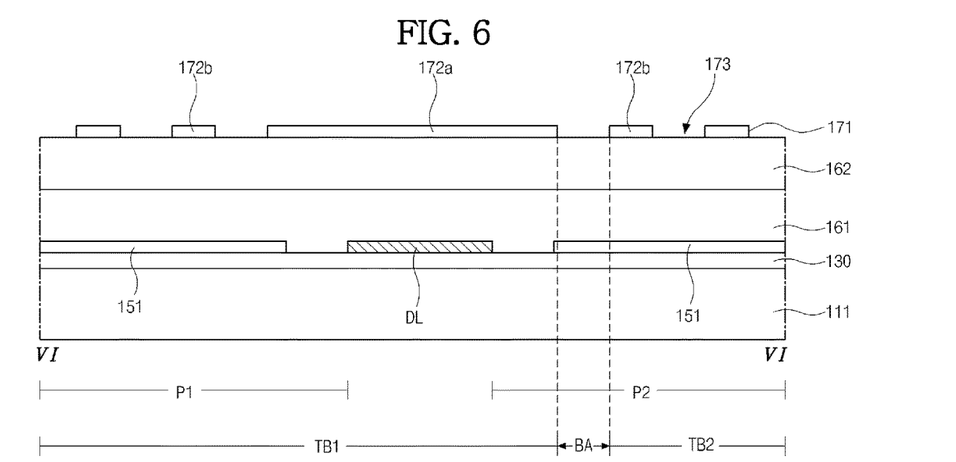
FIG. 6 is a cross-sectional view taken along a line VI-VI of FIG. 4.

FIG. 5 is a cross-sectional view taken along a line V-V of FIG. 3, and FIG. 6 is a cross-sectional view taken along a line VI-VI of FIG. 4. For the purpose of explanations, a cross-sectional structure of an array substrate is shown in FIGS. 5 and 6.

Referring to FIGS. 5 and 6, in the array substrate of the liquid crystal panel 110, the gate line (GL of FIGS. 3 and 4) and the gate electrode 121 are formed on the substrate 111.

The gate insulating layer 130 is formed on the gate line and the gate electrode 121 and substantially over an entire surface of the substrate 111. The gate insulating layer 130 may be made of an inorganic insulating material, for example, silicon oxide or silicon nitride.

The semiconductor layer 131 is formed on the gate insulating layer 130 corresponding to the gate electrode 121. The semiconductor layer may be made of amorphous silicon.

The source and drain electrodes 141 and 143 are formed on the semiconductor layer 131. The data line DL connected to the source electrode 141 is formed on the gate insulating layer 130, and crosses the gate line.

The gate electrode 121, the semiconductor layer 131, and the source and drain electrodes 141 and 143 forms the thin film transistor T.

The thin film transistor T having the inverted-staggered structure is described in the drawings. Alternatively, a thin film transistor T having a coplanar structure may be used.

The pixel electrode 151 may be formed on the gate insulating layer 130 in each pixel region P, and contact the drain electrode 143. Alternatively, an insulating layer may be formed on the drain electrode 143 and have a drain contact hole, and the pixel electrode 151 may be formed on this insulating layer and contact the drain electrode 143 through the drain contact hole.

The pixel electrode 151 may be formed to have substantially a plate shape in the pixel region P. The pixel electrode 151 may be made of a transparent conductive material, for example, ITO, IZO or ITZO.

The first passivation layer 161 may be formed on the data line DL, the source and drain electrodes 141 and 143, and the pixel electrode 151. The first passivation layer 161 may be made of an inorganic insulating material or organic insulating material.

The sensing line SL corresponding to each touch block TB is formed on the first passivation layer 161. The sensing line SL may overlap the data line DL in each touch block TB and extend along the extension direction of the data line DL. Further, the sensing line SL may cover the data line DL with a width greater than that of the data line DL.

Referring to FIG. 6, the sensing line SL is not formed over the data line DL nearest to the boundary between the neighboring touch blocks TB. In other words, in this embodiment, the blocking line of the related art located at the same layer as the sensing line SL is not employed.

The second passivation layer 162 may be formed on the sensing line SL substantially over the entire surface of the substrate 111. The second passivation layer 162 may be made of an inorganic insulating material or organic insulating material. The second passivation layer 162 may have the contact hole (TCH of FIG. 3) exposing a portion of the sensing line SL.

The common electrode 171 is formed on the second passivation layer 162 in each touch block TB. The common electrode 171 contacts the sensing line SL through the contact hole of the second passivation layer 162, and is supplied with a driving signal through the sensing line SL. The common electrode 171 may be made of a transparent conductive material, for example, ITO, IZO or ITZO.

The common electrode 171 may include a plurality of electrode patterns 172 in bar shape facing the pixel electrode 151 in each pixel region P, and the opening 173 between neighboring electrode patterns 172.

The electrode patterns 172 may be configured to extend along the extension direction of the data line DL. The electrode patterns 172 may include the first pattern 172a near the data line DL which is an outermost pattern in the pixel region P, and the second pattern 172b located at an inner side in the pixel region P than the first pattern 172a.

In this case, the first electrode pattern 172a may have a width greater than a width of the data line DL to substantially shield the data line DL. Further, the first electrode pattern 172a may have a width greater than a width of the sensing line SL overlapping the data line DL to substantially shield the sensing line SL.

When the first electrode pattern 172a is formed with this configuration, interference between the pixel electrode 151 and each of the data line DL and the sensing line SL can be prevented.

The second electrode pattern 172b located at the relative inner side may have a width less than a width of the first electrode pattern 172a.

In an alternative example regarding the arrangement of the common electrode 171 and the pixel electrode 151, a common electrode 171 having substantially a plate shape may be formed in each touch block TB, and a pixel electrode 151 having a plurality of electrode patterns may be formed on the common electrode 171 in each pixel region P with an insulating layer therebetween.

In another alternative example, a common electrode 171 and a pixel electrode 151 may each have a plurality of electrode patterns, and be formed on the same layer or different layers with an insulating layer therebetween.

Referring to FIG. 6, the boundary region i.e., the separate region BA between neighboring touch blocks TB along a width direction of the data line DL is configured to be located in the second pixel region P2 as an outermost pixel region of the second touch block TB2.

In other words, the first electrode pattern 172a of the common electrode 171 over the first pixel region P1 goes over the data line DL and extends into the second pixel region P2, and is separated from the common electrode 171 i.e., the outermost second electrode pattern 172b of the second pixel region P2. In this case, the first electrode pattern 172a of the first pixel region P1 can function as an outermost common electrode pattern of the second pixel region P2 and generate an electric field along with the pixel electrode 151 of the second pixel region P2.

By configuring the common electrode 171 as above, the separate region BA between the neighboring first and second touch blocks TB1 and TB2 is not located over the data line DL but is located at the second pixel region P2 as an outermost pixel region of the second touch block TB2.

Thus, a blocking line of the related art is not additionally required over the data line DL near the first and second touch blocks TB1 and TB2.

In other words, according to this embodiment, the boundary between the first and second touch blocks TB1 and TB2 is not located over the data line DL but is located inside the second pixel region P2 at one side of the data line DL, and this data line DL is blocked by the common electrode 171 of the first touch block TB1.

Accordingly, light leakage does not happen over the data line DL, and thus the blocking line of the related art to prevent light leakage is not needed.

Therefore, design and manufacturing process of the LCD can be simplified, and, even in cases of there being a limit on size of the LCD, such as high-resolution model or narrow-bezel model, it can be easy to achieve such a model.

Further, since the increase of a load of the data line due to the blocking line can be prevented, possibility of defect generation at a boundary of a touch block can be removed.

It will be apparent to those skilled in the art that various modifications and variations can be made in a display device of the present invention without departing from the sprit or scope of the disclosure. Thus, it is intended that the present invention covers the modifications and variations of this disclosure provided they come within the scope of the appended claims and their equivalents.

What is claimed is:

1. A touch type liquid crystal display device, comprising:
a first pixel region and a second pixel region that neighbor each other with a data line therebetween, each of the first and second pixel regions including a thin film transistor and a pixel electrode connected to the thin film transistor;
a first touch block and a second touch block including the first pixel region and the second pixel region, respectively;
a common electrode that is arranged in a same substrate as the pixel electrode, and is located in each of the first and second touch blocks;

a first sensing line and a second sensing line that are connected to the common electrode of the first touch block and the common electrode of the second touch block, respectively; and a passivation layer on the pixel electrode and below the common electrode of each of the first and second touch blocks, wherein the common electrode of the first touch block goes over the data line and extends into the second pixel region, wherein the common electrode of the first touch block is electrically disconnected from the common electrode of the second touch block with no sensing line connecting the common electrode of the first touch block with the common electrode of the second touch block, wherein the common electrode includes a plurality of electrode patterns that correspond to each of a plurality of pixel regions included in each of the first and second touch blocks, and extend along an extension direction of the data line, wherein the plurality of electrode patterns include a first electrode pattern that is located at an outermost side and shields a corresponding data line therebelow, and a second electrode pattern that is located at an inner side than the first electrode pattern and has a width less than that of the first electrode pattern, wherein the first electrode pattern corresponding to the first pixel region extends into the second pixel region, and is spaced apart from the second electrode pattern of the second pixel region, and wherein the passivation layer includes a first passivation layer on the pixel electrode and the data line and below the first sensing line and the second sensing line, and a second passivation layer on the first sensing line and the second sensing line and below the common electrode of each of the first and second touch blocks.

2. The device of claim 1, wherein the first sensing line and the second sensing line are arranged to overlap corresponding data lines therebelow, and wherein the first electrode pattern is arranged to shield a corresponding sensing line therebelow.

3. The device of claim 1, wherein the first sensing line and the second sensing lines connect the first touch block and the second touch block, respectively, with a panel driving circuit, and wherein the first sensing line and the second sensing line transfer touch driving signals output from the panel driving circuit to the first touch block and the second touch block, respectively, and transfer a sensing signal of the first touch block and a sensing signal of the second touch block to the panel driving circuit, respectively.

4. The device of claim 1, wherein a plurality of touch blocks including the first and second touch blocks are arranged in rows and columns, and connected to a panel driving circuit through respective sensing lines.

5. A touch type liquid crystal display device, comprising:
a first touch block including a first pixel region;
a second touch block including a second pixel region disposed next to the first pixel region with a data line therebetween, each of the first and second pixel regions including a thin film transistor and a pixel electrode connected to the thin film transistor;
a common electrode disposed in each of the first and second touch blocks, the common electrode including a plurality of electrode patterns that correspond to each of a plurality of pixel regions included in each of the first and second touch blocks and extend along an extension direction of the data line;

a first sensing line and a second sensing line connected to the common electrode of the first touch block and the common electrode of the second touch block, respectively; and a passivation layer on the pixel electrode and below the common electrode of each of the first and second touch blocks, wherein the common electrode of the first touch block includes a first electrode pattern that is disposed at an outermost side and has a width greater than a width of the data line to shield the data line disposed between the first and second pixel regions for preventing interference between the pixel electrode and the data line, wherein the common electrode of the first touch block is electrically disconnected from the common electrode of the second touch block with no sensing line connecting the common electrode of the first touch block with the common electrode of the second touch block, wherein the first electrode pattern corresponding to the first pixel region extends into the second pixel region, and is spaced apart from the second electrode pattern of the second pixel region, wherein each common electrode further includes a second electrode pattern that is located at an inner side than the first electrode pattern and has a width less than that of the first electrode pattern, and wherein the passivation layer includes a first passivation layer on the pixel electrode and the data line and below the first sensing line and the second sensing line, and a second passivation layer on the first sensing line and the second sensing line and below the common electrode of each of the first and second touch blocks.

6. The device of claim 5, wherein the first sensing line and the second sensing line are arranged to overlap corresponding data lines therebelow, and wherein the first electrode pattern is arranged to shield a corresponding sensing line therebelow.

7. The device of claim 5, wherein the first sensing line and the second sensing line connect the first touch block and the second touch block, respectively, with a panel driving circuit, and wherein the first sensing line and the second sensing lines transfer touch driving signals output from the panel driving circuit to the first touch block and the second touch block, respectively, and transfer a sensing signal of the first touch block and a sensing signal of the second touch block to the panel driving circuit, respectively.

8. The device of claim 5, wherein a plurality of touch blocks including the first and second touch blocks are arranged in rows and columns, and connected to a panel driving circuit through respective sensing lines.

9. A liquid crystal display device, comprising:
a first pixel region and a second pixel region that neighbor each other with a data line therebetween, each of the first and second pixel regions including a thin film transistor and a pixel electrode connected to the thin film transistor;
a first touch block and a second touch block including the first pixel region and the second pixel region, respectively;
a common electrode that is arranged in a same substrate as the pixel electrode, and is located in each of the first and second touch blocks;

a sensing line that is connected to the common electrode of each of the first and second touch blocks; and a passivation layer on the pixel electrode and below the common electrode, wherein the common electrode of the first touch block goes over the data line and extends into the second pixel region, wherein the common electrode includes a plurality of electrode patterns that correspond to each of a plurality of pixel regions included in each of the first and second touch blocks, and extend along an extension direction of the data line, wherein the plurality of electrode patterns include a first electrode pattern that is located at an outermost side and shields a corresponding data line therebelow, and a second electrode pattern that is located at an inner side than the first electrode pattern and has a width less than that of the first electrode pattern, wherein the first electrode pattern corresponding to the first pixel region extends into the second pixel region, and is spaced apart from the second electrode pattern of the second pixel region, and wherein the passivation layer includes a first passivation layer on the pixel electrode and the data line and below the sensing line, and a second passivation layer on the sensing line and below the common electrode.

10. The device of claim 9, wherein the sensing line is arranged to overlap a corresponding data line therebelow, and wherein the first electrode pattern is arranged to shield a corresponding sensing line therebelow.

* * * * *